United States Patent
Ferreira da Silva Pereira et al.

(10) Patent No.: US 12,135,414 B2
(45) Date of Patent: Nov. 5, 2024

(54) MECHANICAL TRACKING MOUNT

(71) Applicant: Nimax GmbH, Bavaria (DE)

(72) Inventors: Pedro Manuel Ferreira da Silva Pereira, Palhaca (PT); Christian Fattinnanzi, Montecassiano (IT)

(73) Assignee: Nimax GmbH, Bavaria (DE)

( * ) Notice: Subject to any disclaimer, the term of this patent is extended or adjusted under 35 U.S.C. 154(b) by 527 days.

(21) Appl. No.: 17/518,787

(22) Filed: Nov. 4, 2021

(65) Prior Publication Data
US 2022/0146810 A1 May 12, 2022

Related U.S. Application Data

(60) Provisional application No. 63/112,810, filed on Nov. 12, 2020.

(51) Int. Cl.
*G02B 23/16* (2006.01)
*F16M 11/18* (2006.01)

(52) U.S. Cl.
CPC .......... *G02B 23/165* (2013.01); *F16M 11/18* (2013.01)

(58) Field of Classification Search
CPC ....... G02B 23/165; F16M 11/18; F24S 50/20; F24S 2030/18
USPC ...................................... 359/430; 248/123.11
See application file for complete search history.

(56) References Cited

U.S. PATENT DOCUMENTS

| | | | | |
|---|---|---|---|---|
| 5,402,690 A * | 4/1995 | Sekiguchi | ............ | B25J 19/0016 248/280.11 |
| 5,822,116 A * | 10/1998 | Leblanc | ................. | G02B 23/16 359/430 |
| 9,128,292 B2 * | 9/2015 | Xu | ......................... | G02B 23/165 |
| 9,945,586 B2 * | 4/2018 | Siddiqui | ................ | F24S 30/455 |
| 10,700,634 B2 * | 6/2020 | Flann | ....................... | H02S 20/32 |
| 10,771,007 B2 * | 9/2020 | Corio | ................... | F16M 11/125 |
| 2010/0020394 A1 * | 1/2010 | Taylor | .................. | G02B 23/165 359/430 |
| 2012/0152316 A1 * | 6/2012 | Fischer | ................. | F24S 25/617 136/246 |

(Continued)

FOREIGN PATENT DOCUMENTS

GB         2 445 959 A        7/2008
JP     2009054976 A   *    3/2009

*Primary Examiner* — Ingrid M Weinhold
(74) *Attorney, Agent, or Firm* — DP IP GROUP; Franco S. De Liguori (57) ABSTRACT

A tracking mount for an astronomical equipment includes castellations in a semicircular arrangement at a first end of a base member. The base member has a through hole formed at a radial center of the castellations. Additionally, the tracking mount includes a tracking arm having a shaft extending perpendicular to a long axis of the tracking arm and a set of teeth formed at a position distal to the shaft. The shaft has a notch formed at an end opposite the tracking arm. The shaft is dimensioned to be inserted into the through hole. A coil torsion spring having a crossbar formed at one end is mated with the notch on the shaft. A selector structure formed at another end of the torsion spring is dimensioned to sit within a castellation of the plurality of castellations. Adjusting the position of the selector structure relative to the plurality castellations adjusts the torsion coefficient of the coil torsion spring.

19 Claims, 9 Drawing Sheets

(56) References Cited

U.S. PATENT DOCUMENTS

| | | | |
|---|---|---|---|
| 2013/0233996 A1* | 9/2013 | Taylor | F16M 11/2035 |
| | | | 248/550 |
| 2014/0111853 A1* | 4/2014 | Xu | G02B 23/165 |
| | | | 359/430 |
| 2018/0115276 A1* | 4/2018 | Wildman | H01L 31/0547 |
| 2018/0254740 A1* | 9/2018 | Corio | F16M 11/125 |

* cited by examiner

MECHANICAL TRACKING MOUNT

CROSS-REFERENCE TO RELATED APPLICATION

This application claims priority to U.S. Provisional Patent Application No. 63/112,810, filed on Nov. 12, 2020.

BACKGROUND

Field

The present invention relates to astronomical mounts, and more particularly to mechanical tracking equatorial mounts.

Background Information

Tracking the night sky is necessary for long exposure astrophotography. Professional telescopes track the movement of the night sky with high precision using complex and precise mechanical and electronic parts. Amateur tracking platforms use similar principles as the professional telescopes, albeit with less precision. Modern digital cameras are becoming more and more sensitive, thus requiring less exposure time to record an image. As a result, a digital camera using a charge coupled device (CCD) or a complementary metal-oxide-semiconductor (CMOS) imaging element and a 50 mm objective lens, for example, can record planetary and stellar objects over an exposure period of up to 5 seconds without requiring tracking. However, for longer exposures, or multiple exposures of the same object, the need to track the sky still exists.

The first tracking platforms that where developed for amateur use embraced the concept of mechanical energy to follow the motion of the stars. These systems required multiple reduction gears, weights and counterweights, resulting in a rather bulky, heavy and expensive tracking mount.

With the advent of electronics, purely mechanical mounts became obsolete for a while. However, while electronic motor-driven mounts can be somewhat less bulky, and lighter than the old mechanical mounts, these mounts require a large amount of energy to drive the motors and power the electronics. Thus, battery packs or other external power sources are needed, which reduces the portability of the mount. Therefore, there is a need for a purely mechanical tracking mount that is compact and lightweight and does not need an external power source to operate.

SUMMARY

According to an aspect of the present invention, a tracking mount for an astronomical equipment includes a plurality of castellations in a semicircular arrangement at a first end of a support member. The support member has a through hole formed at a radial center of the plurality of castellations. Additionally, the tracking mount includes a rotating arm. The rotating arm includes a shaft extending perpendicular to a long axis of the rotating arm. The shaft has a notch formed at an end opposite the rotating arm. The shaft is dimensioned to be inserted into the through hole. A torsion spring having a crossbar formed at one end is mated with the notch on the shaft. A selector structure formed at another end of the torsion spring is dimensioned to sit within a castellation of the plurality of castellations. Adjusting the position of the selector structure relative to the plurality of castellations adjusts the torsion coefficient of the torsion spring, thus, controlling the tracking rate of the tracking mount. The spring serves to control the tracking speed, and to balance the weight of the instrumentation that is applied to a mount head attached to the tracking mount. The spring, with its force set by an operator adjusting the position of the selector, can replace the heavy counterweights that are normally used to balance the weight of the instrumentation.

According to another aspect of the present invention, a mechanical tracking mount is presented. The mechanical tracking mount includes a plurality of castellations in a semicircular arrangement at a first end of a base member. The base member can have a through hole formed at a radial center of the plurality of castellations. Additionally, a tracking arm, having a shaft extending perpendicular to a long axis of the tracking arm and a set of teeth formed at a position distal to the shaft, is dimensioned to be inserted into the through hole. The shaft can have a notch formed at an end opposite the tracking arm. The mechanical tracking mount also includes a coil torsion spring having a crossbar formed at one end configured to mate with the notch on the shaft. The coil torsion spring can have a selector structure formed at another end of the coil torsion spring. The selector structure is dimensioned to sit within a castellation of the plurality of castellations. Adjusting the position of the selector structure relative to the plurality castellations adjusts the coil torsion coefficient of the torsion spring.

In yet another aspect of the present invention, a plurality of castellations in a semicircular arrangement are formed at a first end of a base member. The base member can have a through hole formed at a radial center of the plurality of castellations. A tracking arm having a set of teeth formed along an edge perpendicular to a long axis of the tracking arm is rotatably held at the radial center of the plurality of castellations. A coil torsion spring is anchored at a first end, and includes a selector structure formed at a second end of the coil torsion spring. The selector structure can be dimensioned to sit within a castellation of the plurality of castellations.

In a further aspect of the present invention, a mechanical tracking mount for tracking celestial objects by an astronomical equipment mounted thereon is presented. The mechanical tracking mount includes holding means for holding the astronomical equipment to the mechanical tracking mount, mass balancing means for counter balancing the mass of the astronomical equipment held by the holding means, tracking means for rotating the astronomical equipment in synchronization with rotation of the celestial objects, and mechanical timing means for generating rotation of the tracking means by an unwinding action of a spiral torsion spring.

These and other features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein.

DETAILED DESCRIPTION OF PREFERRED EMBODIMENTS

Typically, equatorial mounts track a celestial object using an electric motor coupled to an axis (namely, the right-ascension axis) of the mount extending parallel to the rotational axis of the celestial sphere. The electrical motor requires a battery pack or other source of electrical power as well as a motor drive circuit that controls the motor to rotate at a correct rate relative to the rotation of the celestial sphere. Consequently, equatorial mounts that can track a celestial body automatically can be bulky and quite heavy. Moreover, situations arise where an electrical power source is not available at the remote site, either because the site is not equipped with electrical utility service or portable batteries are depleted. In either case, a user of the mount can become frustrated, resulting in an unpleasant overall experience.

Embodiments of the present invention provide a compact equatorial mount for astronomical equipment, such as optical equipment (e.g., telescopes, cameras, etc.), for example. For a given load capacity, the embodiments of the present invention can be lightweight in comparison to motorized equatorial mounts. Embodiments of the present invention utilize a mechanical system to provide equatorial tracking. Thus, embodiments of the present invention do not rely on electrical motors and electrical power sources. Exemplary embodiments of the present invention are described herein with reference to FIG. 1 through FIG. 9. In the figures, like components, elements and structures are referenced by like numerals.

Figure 1:
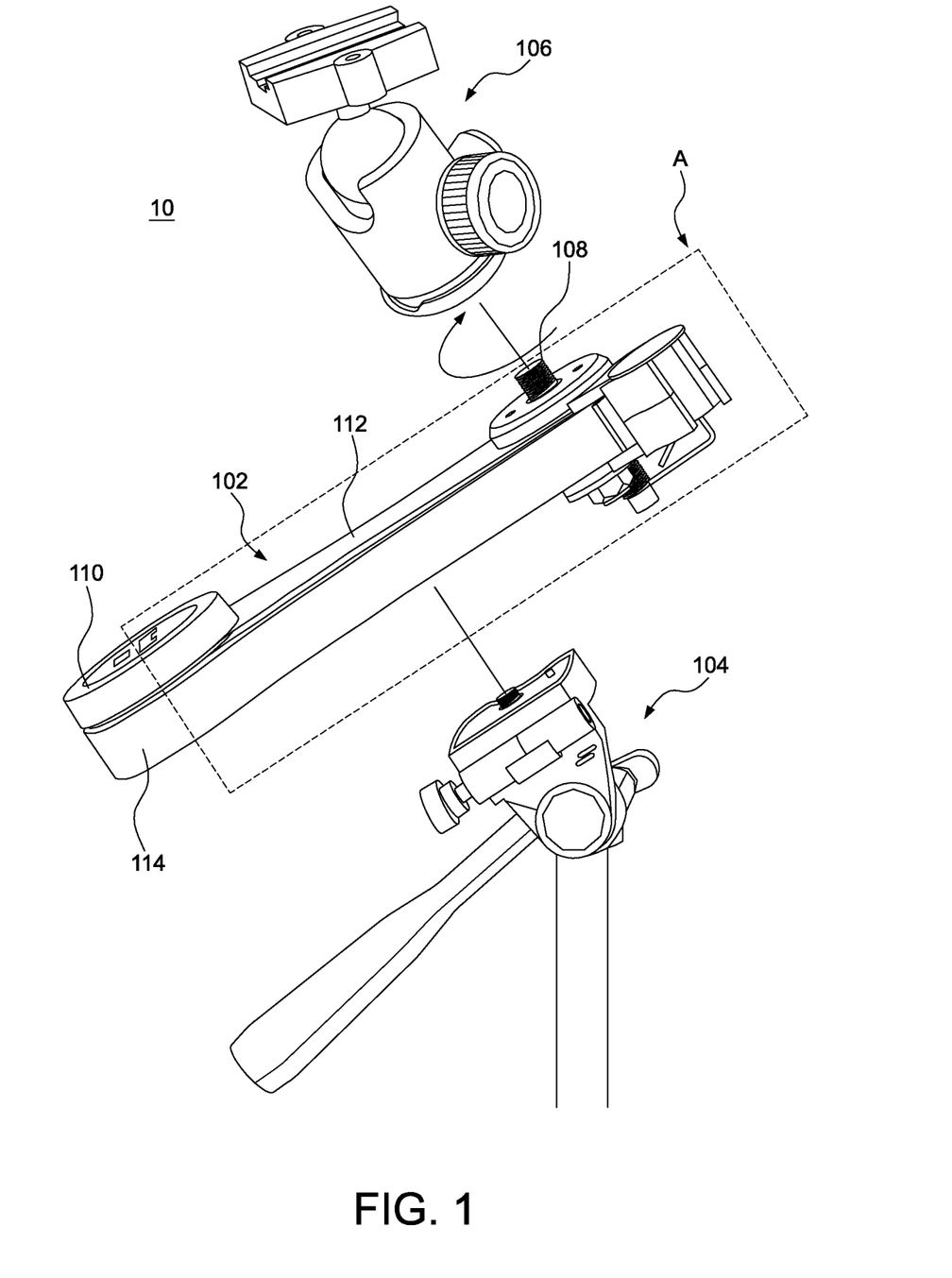
FIG. 1 is a schematic representation of a mechanical tracking mount, in accordance with an embodiment of the present invention.

Turning to FIG. 1, an embodiment of the present invention is shown. A mechanical tracking system 10 of the present embodiment includes a mechanical tracking mount assembly 102 (hereinafter also referred to as "tracking mount 102"). The mechanical tracking mount 102 is attached to a photographic tripod 104 or other types of tripods. Additionally, a mount head 106, such as a ball head or pan-tilt head, is mounted to a holding means, such as a mount bolt 108, for example, provided at a first end (e.g., tracking end) of a tracking arm 112 that is rotationally coupled to a base member 114 of the mechanical tracking mount assembly 102. When the mechanical tracking mount 102 is properly aligned for use, the mount bolt 108 points to a celestial pole, either the north celestial pole (NCP) near Polaris or the south celestial pole (SCP) near Sigma Octantis. Thus, as with other equatorial mounts, the rotational axis of the mount bolt 108 tracks the apparent motion of celestial sphere (e.g., Right Ascension). The mount head 106 allows optical equipment attached thereto to be pointed at a target object. Once the optical equipment is pointed at a target object, rotation of the mount bolt 108 caused by the movement of the tracking arm 112 will maintain the target object within a viewing area of the optical equipment.

While FIG. 1 and the description herein places the mount head 106 at the center of rotation of the tracking arm 112, embodiments of the present invention are not limited by this arrangement. The mount head 106 can be mounted at any point along the tracking arm 112. Moreover, the tracking arm 112 can extend beyond the center of rotation, with the mount head 106 also being positioned beyond the center of rotation, as well.

Figure 7:
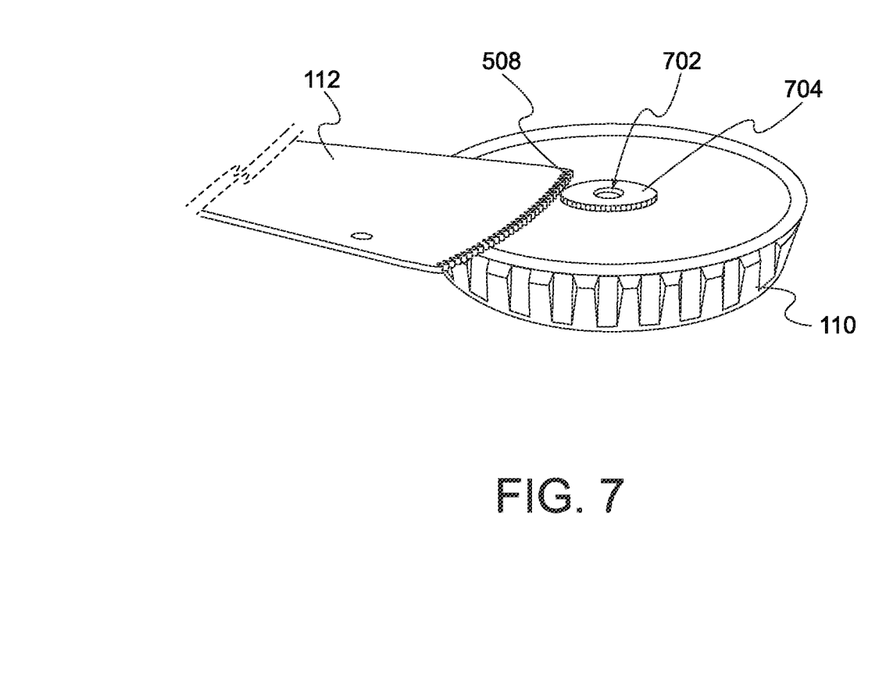
FIG. 7 is a view of a portion of the mechanical tracking mount, in accordance with an embodiment of the present invention.

At an opposite end of the mechanical tracking mount 102, a winding knob 110 is affixed thereto. The tracking arm 112 includes a plurality of teeth, for example, teeth 508 shown in FIG. 5. The teeth 508 of the tracking arm 112 mesh with a gear 802 (shown in FIG. 8) rotated by the winding knob 110. In some embodiments, a gear 704 (shown in FIG. 7) can replace the gear 802, and formed as an integral structure of the winding knob 110 as shown in FIG. 7. In other embodiments, the gear 704 in contact with the teeth 508 of the tracking arm 112 can be driven by the winding knob 110 via one or more intervening gears (not shown).

In an embodiment, the teeth 508 of the tracking arm 112 are arranged in an arc. In another embodiment, the teeth of the tracking arm 112 can be arranged in an arc equaling a full circle (e.g., a 360° angle), such that the tracking arm 112 is formed as a spoke extending from a position along the perimeter of the circle to a center of the circle. In other embodiments the arc formed by the teeth can be less than 360° as desired. The angle of the arc can determine the tracking length, for example, 1 hour, 2 hours, 3 hours, 6 hours, 8 hours, up to 24 hours. The number of teeth 508 can determine the accuracy of the tracking. For example, the teeth 508 can number 31 and be spaced at a separation of 0.72° therebetween.

In an alternative embodiment, the teeth 508 can be replaced with a high friction region formed at the end surface of the tracking arm 112. The high friction region can be a textured surface in an embodiment. In another embodiment, the high friction region can be formed of a material (such as rubber, for example) having coefficient of friction selected to avoid slippage during operation at the desired upper weight limit of the astronomical equipment. In this embodiment, a friction drive wheel can be integrated into the winding knob 110 in place of gear 704, or on the output shaft 506, replacing gear 802 shown in FIG. 8. The friction drive wheel can be configured to contact the friction region of the tracking arm 112. The teeth 508 and the friction region are representative examples of a tracking arm moving means.

The winding knob 110 is further coupled to a timing means, such as timing assembly 504 (shown in FIG. 5), for example. The timing assembly 504 can have a plurality of gears and a spiral torsion spring (not shown) housed in a casing. The spiral torsion spring is wound by the winding knob 110 at the same time that the tracking arm 112 is rotated to its start position. Release of the winding knob 110 allows the spiral torsion spring to unwind, thus driving the plurality of gears to rotate the tracking arm 112 back to a rest position over a predefined period of time, for example, 60 minutes. The timing assembly 504 functions, thus, as a wind-up clockwork mechanism, as known in the art, to provide gear movement, e.g., beats, at defined time intervals, e.g., seconds, minutes, etc.

As noted above, 31 teeth 508 at a separation of 0.72° can be used. However, the number of teeth 508 used is affected by the timing assembly 504. Specifically, the clockwork mechanisms used in the timing assembly 504 are generally standardized to provide movement over a period of 60 minutes and thus the use of 31 teeth 504 can provide a sufficiently accurate tracking of Celestial objects. However, timing means that do not conform to the standardized 60-minute clockwork mechanisms can be used as well, but such embodiments may have alternative numbers of teeth 504 to attain a desired level of tracking accuracy.

In the present embodiment, the mechanical tracking mount is operated by turning the winding knob 110, which rotates the tracking arm 112 around an axis coaxial to the mount bolt 108. Releasing the winding knob 110 allows the tracking arm 112 to rotate, under the influence of the timing assembly 504, back to a rest position. A rest position, herein, is understood to be a position of the tracking arm coinciding with the spiral torsion spring being in an unwound state. The mount bolt 108 is affixed to the tracking arm 112 such that the rotation of the tracking arm 112 rotates the mount bolt 108. Consequently, the mount head 106, and any astronomical equipment mounted thereto, is rotated by the tracking arm 112.

The timing assembly 504 rotates the tracking arm 112, which allows the mount to track. The optical equipment can be aimed to a target object using the mount head 106. As the tracking arm 112 rotates, the center of mass is displaced in relation to the mechanical axis of the tracking mount 102 (see FIG. 3A-FIG. 3E).

Figure 3A:
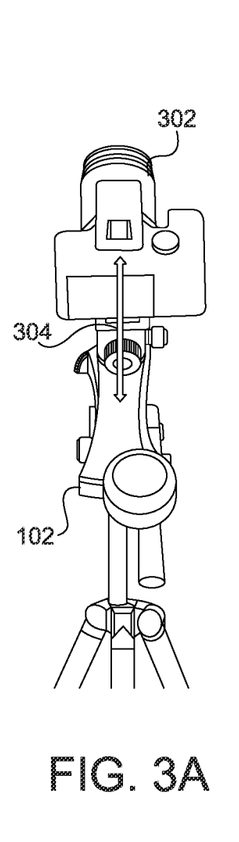
FIG. 3A-3E are schematic representations of different orientations of astronomical equipment mounted on an embodiment of the mechanical tracking mount according to the present invention.

Referring to FIG. 3A-3E, with the beats per minute (bpm) of the timing assembly 504 set to around 135 bpm with a tolerance of 3 bpm, for example, the tracking can be correctly synchronized with sidereal motion, e.g., the apparent motion of the stars due to the rotation of the Earth. However, the equipment can shift the center of mass of the system, which can virtually accelerate or retard (e.g., decelerate) the movement of the timing assembly 504. FIG. 3A shows the equipment 302 with its center of mass aligned with the rotational axis of the tracking mount 102. With the center of mass of the equipment aligned, as shown in FIG. 3A, the timing assembly 504 does not experience an external accelerating or retarding force. Thus, the timing assembly 504 can be said to operate at its native bpm.

Figure 2:
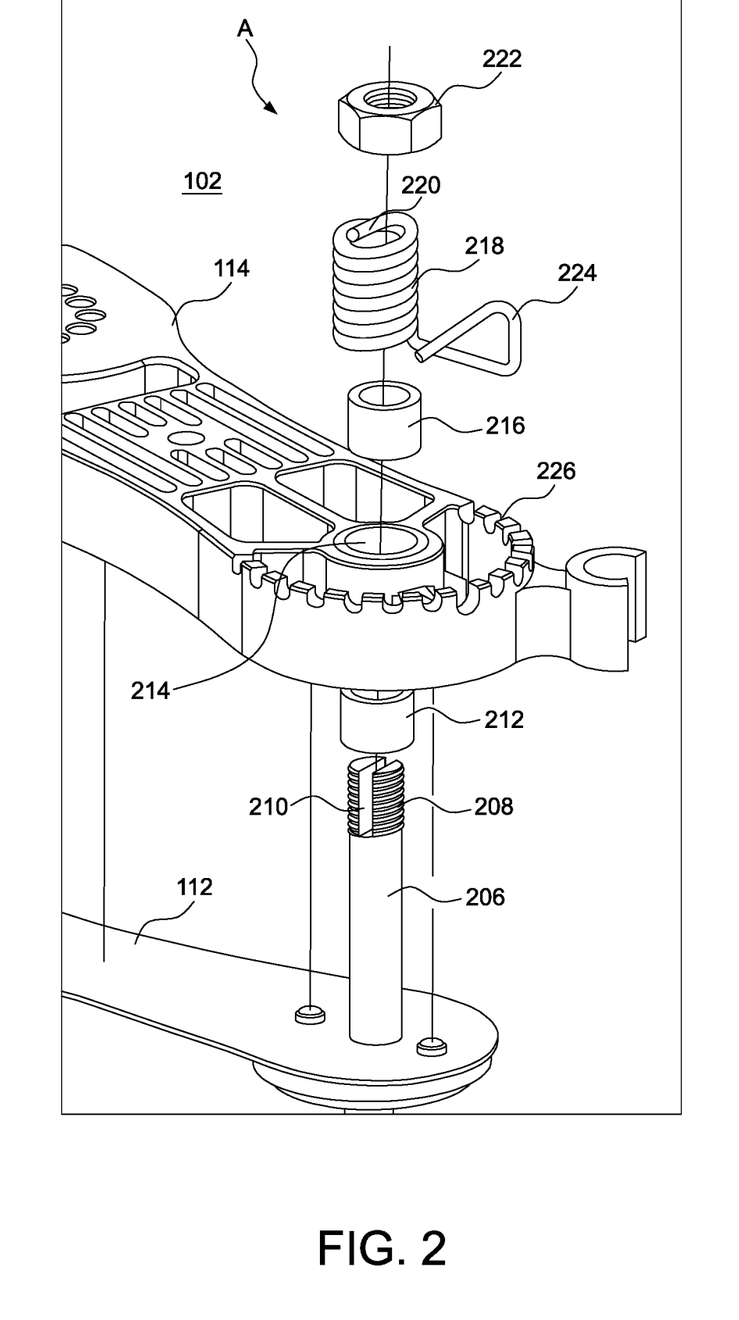
FIG. 2 is an exploded view of a portion of the mechanical tracking mount, in accordance with the embodiment of the present invention shown in FIG. 1.
Figure 3B:
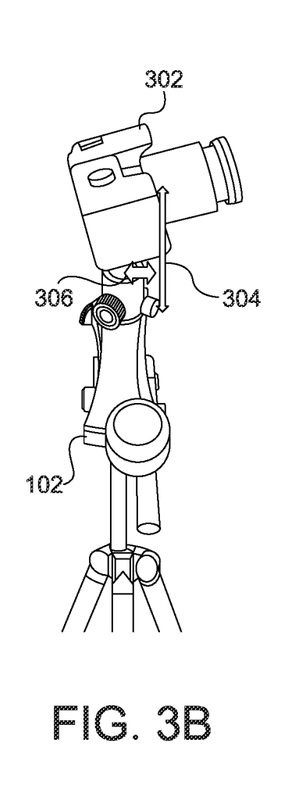
Figure 3C:
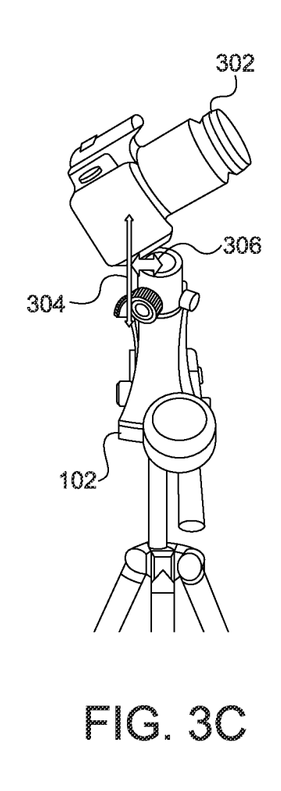
Figure 3D:
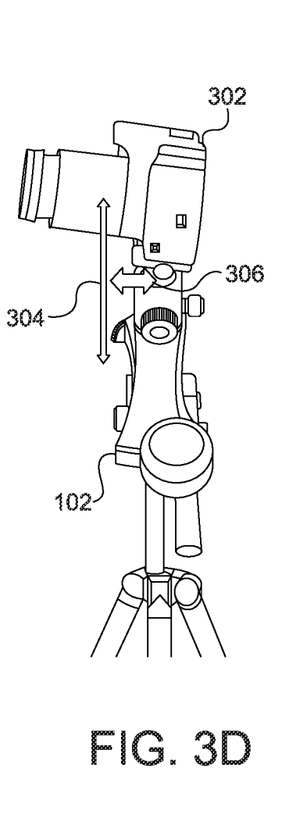
Figure 3E:
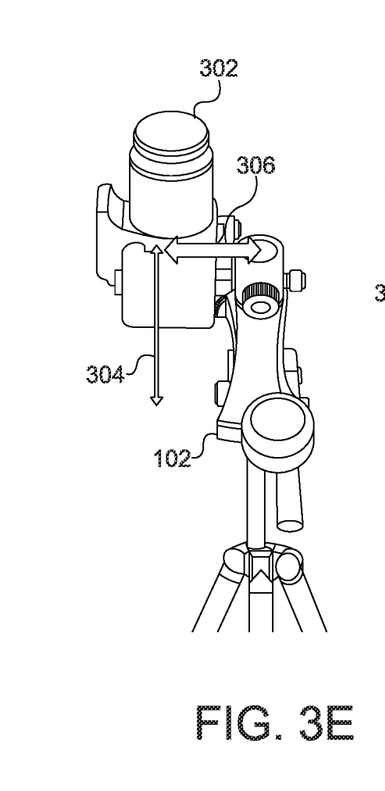

When the equipment 302 is shifted to the right along the direction indicated by arrow 306 of the tracking mount 102, as shown in FIG. 3B, for example, the force of gravity ($g_n$), represented by vertical arrow 304, acts on the equipment 302 with respect to the rotation of the timing assembly 504, thus virtually accelerating the tracking rate of the tracking mount 102. On the other hand, the opposite can also occur. When the equipment 302 is shifted to the left along the direction indicated by arrow 306 of the tracking mount 102, as shown in FIG. 3C-3E, the force of gravity ($g_n$) 304, acts on the equipment in a manner that can retard the tracking. To avoid this acceleration or deceleration, embodiments of the present invention employ a system (shown in an exploded view of FIG. 2) to counteract the center of mass off-set of the equipment 302 and bring the bpm to an appropriate value, for example, 135±3 bpm. However, for other tracking, e.g., lunar motion or solar motion, other bpm values can be employed as appropriate, and without deviating from the present invention. The system shown in FIG. 2 is an example of a mass balancing means for counter balancing the mass of an attached astronomical instrument. Other appropriate mass balancing means can be employed without deviating from the present invention.

FIG. 2 provides an exploded view of a section of the mechanical tracking mount 102 identified by reference A in FIG. 1, namely the system for counteracting the center of mass off-set of astronomical equipment mounted to the mechanical tracking mount 102, described above. The tracking arm 112 has bolt 206 provided on a side opposite to the mount bolt 108 and positioned coaxially with the mount bolt 108. The bolt 206 has a length sufficient to extend through a first bearing 212, a through hole 214 formed on the base member 114, a second bearing 216 and through a central hole of a coil torsion spring 218. Bearing 212 and bearing 216 can be any appropriate rotatable support means, such as ball bearings, roller bearings, or needle bearings as appropriate. Preferably, bearing 212 and bearing 216 are needle bearings, since needle bearings can support greater loads than similarly sized ball bearings. The free end 208 of the bolt 206 is threaded and configured to receive nut 222. Nut 222 is sized to hold the tracking arm 112 to the base member 114. The bolt 206, first bearing 212, second bearing 216 and coil torsion spring 218 in combination are an example of a mass balancing means for balancing the mass of the astronomical equipment mounted on the holding means. Other mass balancing means can be substituted as appropriate without deviating from the present invention.

Additionally, the free end 208 of the bolt 206 includes a transverse channel 210 configured and dimensioned to receive and hold a crossbar 220 formed at a first end of the coil torsion spring 218. The second end of the coil torsion spring is formed into a selector structure 224 dimensioned to sit in one of a plurality of grooves defining castellations 226 formed along a semi-circular perimeter of the base member 114. The coil torsion spring 218 can be constructed of a resilient metal or metal alloy, such as, for example, carbon steel, stainless steel, etc.

By adjusting the position of the selector structure 224 relative to the castellations 226, the torsion of the coil torsion spring 218 can be increased or decreased as desired. Specifically, increasing the torsion can have the effect of increasing the angular velocity of the tracking arm 112 for a given weight of a payload (e.g., astronomical equipment). Alternatively, increasing the torsion can result in driving a heavier payload at a same angular velocity as a lower torsion. Thus, by adjusting the torsion of the coil torsion spring 218, embodiments of the present invention can track objects that move across the sky at a rate different than sidereal rate, for example, the moon, planets and other intra-solar system objects. Moreover, the adjustable tension allows for a wide range of instrument weights that can be driven at an appropriate angular velocity.

The castellations 226 allow for a simpler manufacturing process as well as reduced production cost. The castellations 226 can be integrally formed on the base member 114, which can allow for additive printing (e.g., 3D printing) to be used in the manufacture of the base member 114. In some embodiments, the castellations 226 can be formed on the base member 114 by a milling process, which can be especially useful when fabricating the base member 114 from aluminum or other appropriate metal or metal alloy. In other embodiments, the base member 114 can be manufactured using a casting process, in which the mold used includes features for forming the castellations 226 on the base member 114. Furthermore, usage of integrally formed castellations 226 also allows for greater precision in the placement of the grooves. The number and distribution of the grooves can be dependent on the strength of the coil torsion spring 218 and the level of adjustment desired. Thus, more grooves can allow for a much finer adjustment of the tension of the coil torsion spring 218. However, in an embodiment one groove is positioned to correspond with a neutral point along the semi-circular perimeter of the base member 114 that does not impart tension on the coil torsion spring 218. For example, a centrally positioned groove can correspond to the neutral point.

As described above, the pair of bearings 212, 216 are installed on the bolt 206. In some embodiments, the bearings 212, 216 can be needle bearings, which can eliminate backlash when tracking. In alternative embodiments, less expensive bushings can be used in place of the bearings 212, 216.

Figure 4:
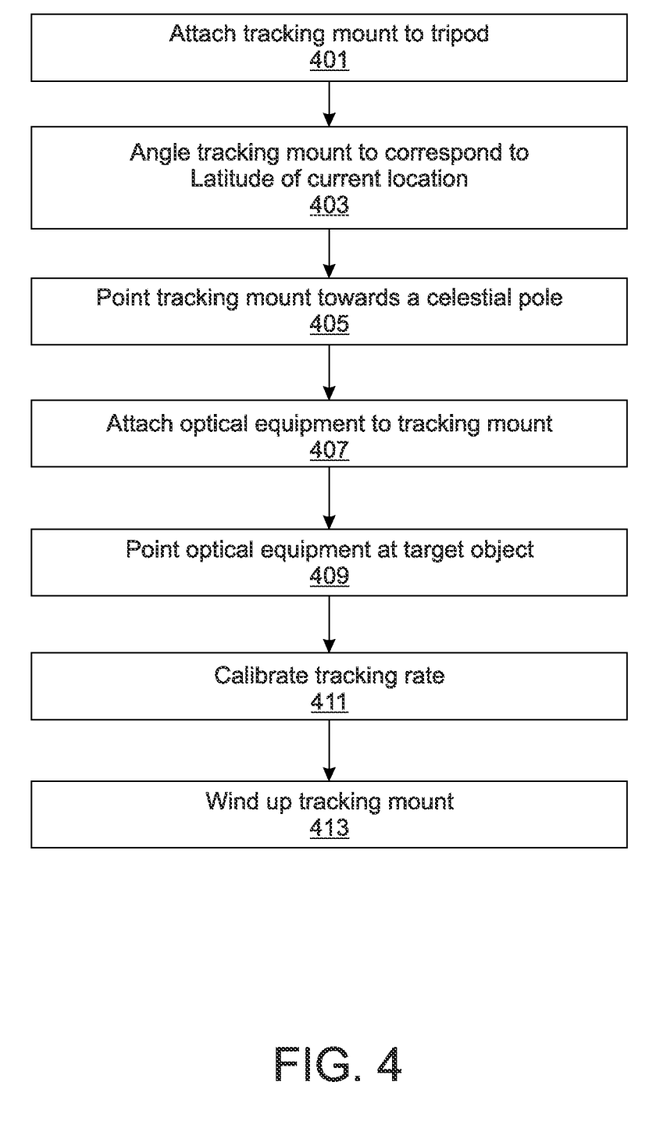
FIG. 4 is a flow representation of a method for using an embodiment of the present invention.

FIG. 4 shows a procedure for using an embodiment of the present invention to track a celestial object. At block 401, the tracking mount 102 is attached to a tripod. The tracking mount 102 is angled to match the latitude where the tracking mount 102 is set up, for example, approximately 41° North for New York City, at block 403. The tracking mount 102 is positioned so that the rotational axis of the tracking mount 102 is aligned with a celestial pole, such as near the star Polaris, which approximates the position of the north celestial pole (NCP), at block 405. The tracking mount 102 is now polar-aligned, meaning the rotation of a camera, for example, mounted on the tracking mount 102 will rotate in the same direction as the celestial sphere.

At block 407, the optical equipment is screwed onto the mount bolt 108. If a mount head 106 is attached to the mount bolt 108, the optical equipment can be attached to the mount head 106, instead. The optical equipment is pointed at a target object, at block 409. At block 411, the tracking mount 102 is calibrated by moving the selector 224 from one groove to another groove of the castellations 226.

To calibrate the timing of the tracking mount 102, a first test run can be executed with the selector 224 set to an arbitrary groove of the castellations 226, for example, setting the selector 224 to the center groove, which corresponds with the native bpm. Based on the results of the first test run, the selector 224 can be moved to a groove to the right (to accelerate) or left (to decelerate) of the arbitrary groove. The calibration can be carried out multiple times to arrive at an acceptable tracking rate.

The correct balance can also be checked by turning the winding knob 110 clockwise and counterclockwise, if the force required to rotate winding knob 110 in both directions is similar, the balance offered by the spring will be correct.

Once the calibration of block 411 is completed, the winding knob 110 is fully rotated to wind up the timing assembly 504 at block 413 to track the target object. In some embodiments the timing assembly 504 is configured to move over a period of an hour, however, other embodiments can be configured to operate over other timing durations, such as 30 minutes, 2 hour, 5 hours, etc., for example. It should be noted that the loading of the timing assembly 504 at block 413 can cause a shift in the position of the optical instrument, necessitating re-aiming the optical instrument at the target object before imaging the target object.

Alternatively, the winding knob 110 can be fully rotated, winding up the timing assembly, prior to executing the aiming at block 409. By preloading the timing assembly prior to aiming the optical equipment, and performing the calibration, a final re-aiming can be avoided.

Figure 5:
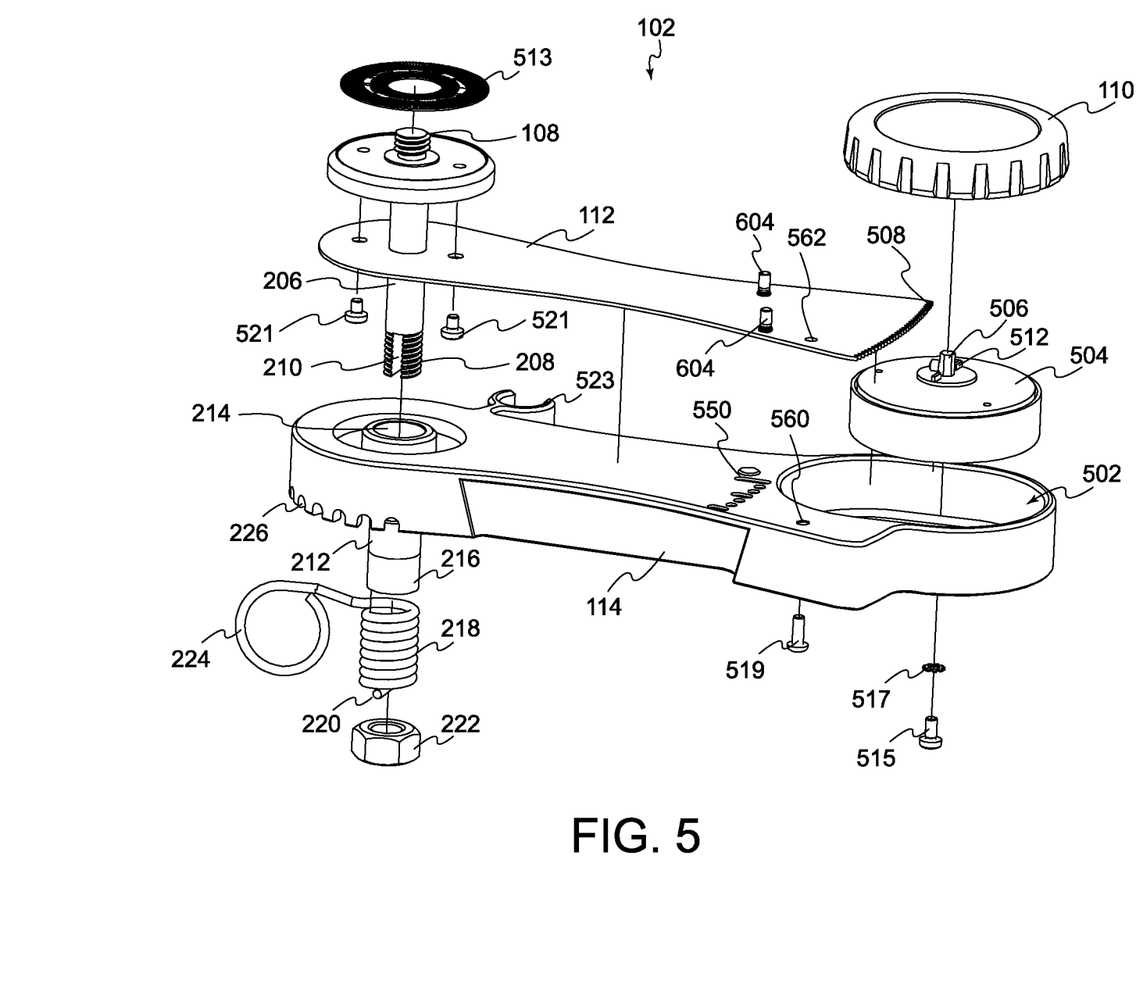
FIG. 5 is an exploded view of the mechanical tracking mount, in accordance with the embodiment of the present invention shown in FIG. 1.
Figure 8:
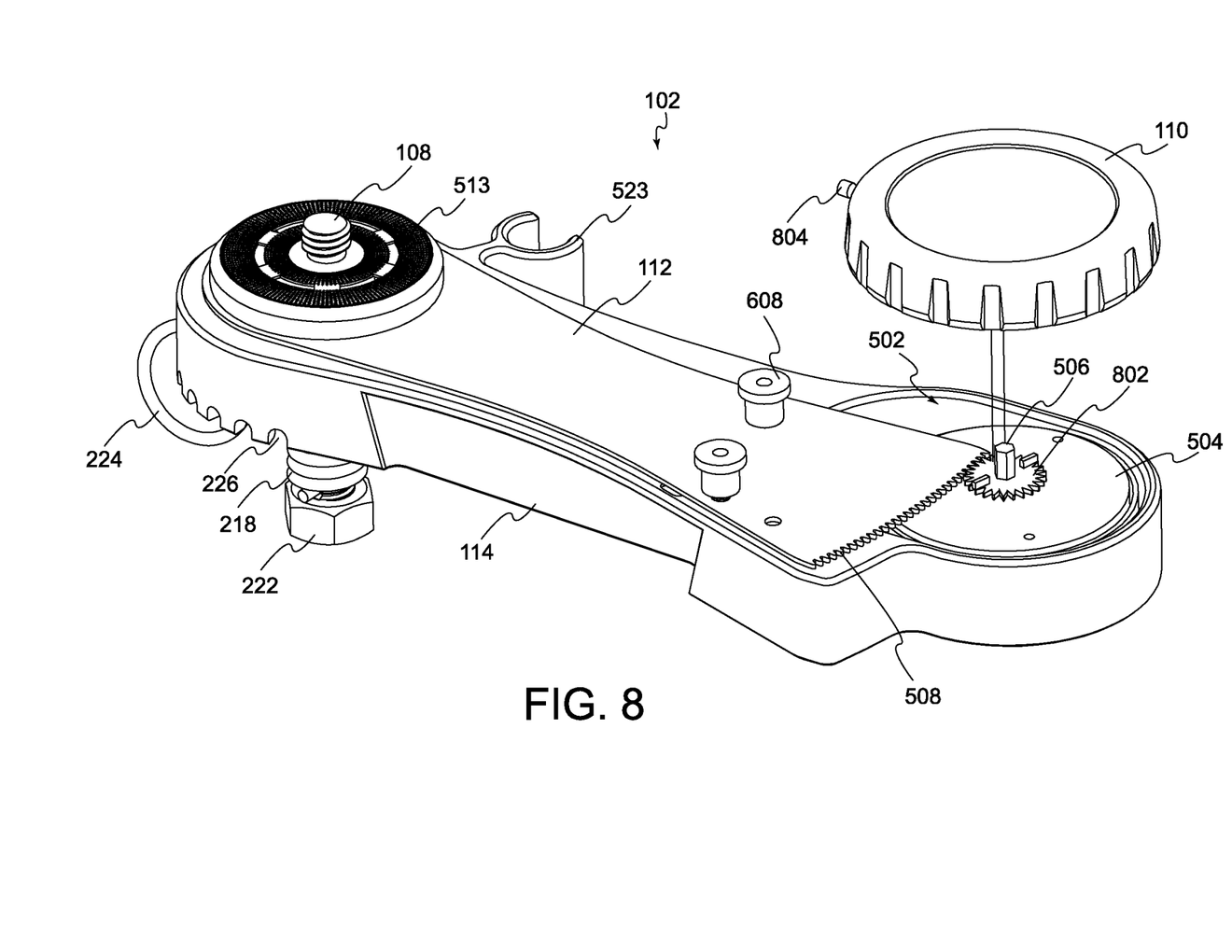
FIG. 8 is a partially exploded view of the mechanical tracking mount, in accordance with the embodiment shown in FIG. 5.

Turning to FIG. 5 and FIG. 8, an exploded view of the mechanical tracking mount 102 in accordance with an embodiment of the present invention is shown in its entirety.

The mechanical tracking mount 102 includes a support means, such as a base member 114, a tracking means, such as a tracking arm 112, a winding means, such as winding knob 110 and a holding means, such as a mounting bolt 108.

The mounting bolt 108 is held onto a top surface of the tracking arm 112 by fastening means, such as bolts 521, for example. A protective material 513, such as a rubber or plastic mat, for example, can be placed to surround the mounting bolt 108. The protective material 513 provides a protective non-abrasive surface between the mechanical tracking mount 102 and the instrument or the mount head 106 shown in FIG. 1. The tracking arm 112 can include a pair of adapter mounting bolts 604. The function of the adapter mounting bolts 604 will be described below with respect to FIG. 6 and FIG. 9.

A bolt shaft 206 extends from the mounting bolt 108 and is dimensioned to extend through a through hole formed in the tracking arm 112. Moreover, the bolt shaft 206 further extends through a through hole 214 formed in the base member 114. The bearing 212, the bearing 216, and the coil torsion spring 218 are placed on the bolt shaft 206 as well, such that the bolt shaft 206 extends through central through holes formed on the first bearing 212, the second bearing 216 and the coil torsion spring 218. Preferably, bearing 212 and bearing 216 are needle bearings, since needle bearings can support greater loads than similarly sized ball bearings. The free end 208 of the bolt 206 is threaded and configured to receive nut 222. Nut 222 is sized to hold the tracking arm 112 to the base member 114.

Additionally, the free end 208 includes a transverse channel 210 configured and dimensioned to receive and hold a crossbar 220 formed at a first end of the coil torsion spring 218. The second end of the coil torsion spring 218 is formed into a selector structure 224 dimensioned to sit in one of a plurality of grooves formed as castellations 226 along a semi-circular perimeter of the base member 114, as described above with reference to FIG. 1. The coil torsion spring 218 can be constructed of a resilient metal or metal alloy, such as, for example, carbon steel, stainless steel, etc.

By adjusting the position of the selector structure 224 relative to the castellations 226, the torsion of the coil torsion spring 218 can be increased or decreased as desired. Specifically, increasing the torsion can have the effect of increasing the angular velocity of the tracking arm 112 for a given weight of a payload (e.g., astronomical equipment).

Alternatively, increasing the torsion can result in driving a heavier payload at a same angular velocity as a lower torsion. Thus, by adjusting the torsion of the coil torsion spring 218, embodiments of the present invention can track objects that move across the sky at a rate different than sidereal rate, for example, the moon, planets and other intra-solar system objects. Moreover, the adjustable tension allows for a wide range of instrument weights that can be driven at an appropriate angular velocity.

As noted above, the castellations 226 allow for a simpler manufacturing process as well as reduced production cost. The castellations 226 can be integrally formed on the base member 114, which can allow for additive printing (e.g., 3D printing) to be used in the manufacture of the base member 114. In some embodiments, the castellations 226 can be formed on the base member 114 by a milling process, which can be especially useful when fabricating the base member 114 from aluminum or other appropriate metal or metal alloy. In other embodiments, the base member 114 can be manufactured using a casting process, in which the mold used includes features for forming the castellations 226 on the base member 114. Furthermore, usage of integrally formed castellations 226 also allows for greater precision in the placement of the grooves. The number and distribution of the grooves can be dependent on the strength of the coil torsion spring 218 and the level of adjustment desired. Thus, more grooves can allow for a much finer adjustment of the tension of the coil torsion spring 218. However, in an embodiment one groove is positioned to correspond with a neutral point along the semi-circular perimeter of the base member 114 that does not impart tension on the coil torsion spring 218. For example, a centrally positioned groove can correspond to the neutral point.

Figure 9:
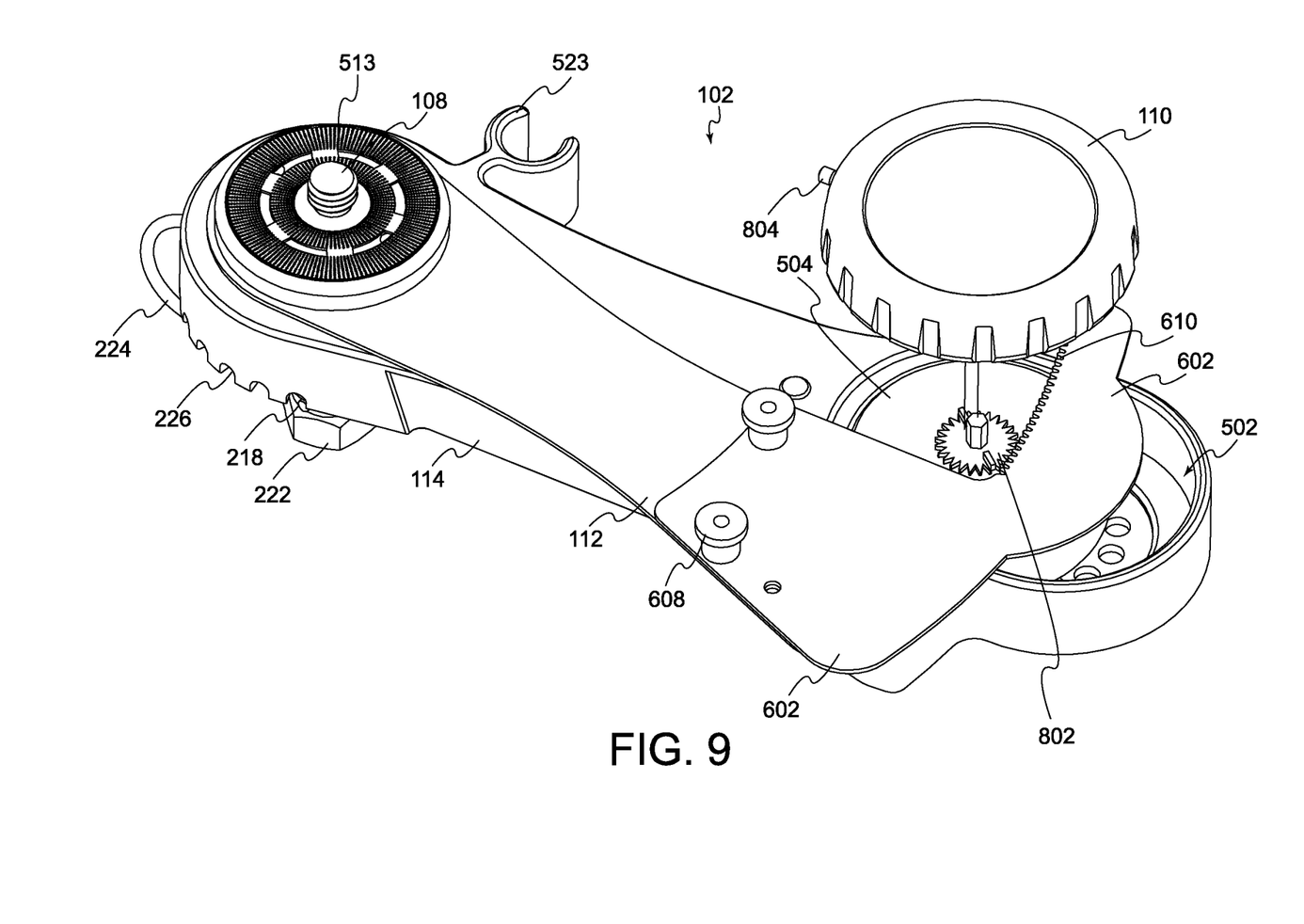
FIG. 9 is a partially exploded view of the mechanical tracking mount, in accordance with the embodiment shown in FIG. 6.

At an end of the base member 114 distal to the through hole 214, a void 502 is formed on the surface of the base member 114. The void 502 can be formed as a circular, rectangular or elliptical void. In the present embodiment, the void 502 has a substantially elliptical shape. The void 502 is dimensioned to receive a mechanical timing means, such as a timing assembly 504, for example. As shown in FIG. 8 and FIG. 9, the timing assembly 504 can be positioned at a first end of the void 502 or a second end of the void 502 depending on whether the mechanical tracking mount 102 is configured for operation in the northern hemisphere or the southern hemisphere. A bolt 515 and a washer 517 hold the timing assembly 504 within the void 502 of the base member 114.

The timing assembly 504 includes an output shaft 506 on which is mounted a drive gear, such as gear 802 (shown in FIG. 8), for example. The gear 802 is configured to mesh with the teeth 508 of the tracking arm 112 as shown in FIG. 8. The configuration shown in FIG. 8 can be used to track celestial bodies in the northern hemisphere. A configuration of the mechanical tracking mount 102 that can be used to track celestial bodies in the southern hemisphere is described below with reference to FIG. 6 and FIG. 9.

Protrusions 512 extend vertically from a top surface of the gear 802 and located at opposite sides of the output shaft 506. The output shaft 506 and the protrusions are held by features formed on a bottom surface of the winding knob 110. A set screw 804, shown in FIG. 8, can be provided to secure the winding knob 110 to the output shaft 506.

In FIG. 5, the output shaft 506 is shown to have a hexagonal cross-section, however, other cross-sectional shapes (e.g., semicircular, circular, or rectangular, for example) can be used without deviating from the present invention. Turning the winding knob 110 applies a rotational force on the output shaft to wind a spiral torsion spring of the timing assembly 504. Additionally, when turning the winding knob 110 a rotational force is applied to the protrusions 512, which in turn rotates the gear 802 and advances the tracking arm to a start position. Indicia markings 550 on the surface of the base member 114 can be used to indicate time remaining before the tracking arm returns to its rest position, e.g., unwound position.

A polar scope bracket 523 can be provided on the base member. The polar scope bracket 523 can be configured to hold a polar scope (not shown) in parallel alignment with the rotational axis of the tracking arm 112. As with other equatorial mount designs, proper tracking of celestial bodies requires that the axis of rotation of the mechanical tracking mount 102 coincides with the rotational axis of the celestial sphere. Thus, in the northern hemisphere the rotational axis of the tracking arm 112 should point to a region near Polaris (North Celestial Pole). In the southern hemisphere the rotational axis of the tracking arm 112 should point to a region near Sigma Octantis (South Celestial Pole). A polar scope can greatly assist in precisely aligning the mechanical tracking mount 102 with the appropriate celestial pole.

An alignment bolt 519 is provided that can be inserted into through-hole 560 formed on the base member 114 and extends through through-hole 562 formed on the tracking arm 112. When the tracking arm 112 is correctly aligned relative to the base member 114, the alignment bolt 519 will extend through through-hole 560 and through-hole 562. Proper alignment of the tracking arm 112 relative to the base member 114 provides consistent and predictable tracking periods.

Additionally, the alignment bolt 519 can be used as a locking means for locking the tracking arm 112 relative to the base member 114. Locking the tracking arm 112 can be useful for preventing unwanted movement of the tracking arm 112 during transport.

Figure 6:
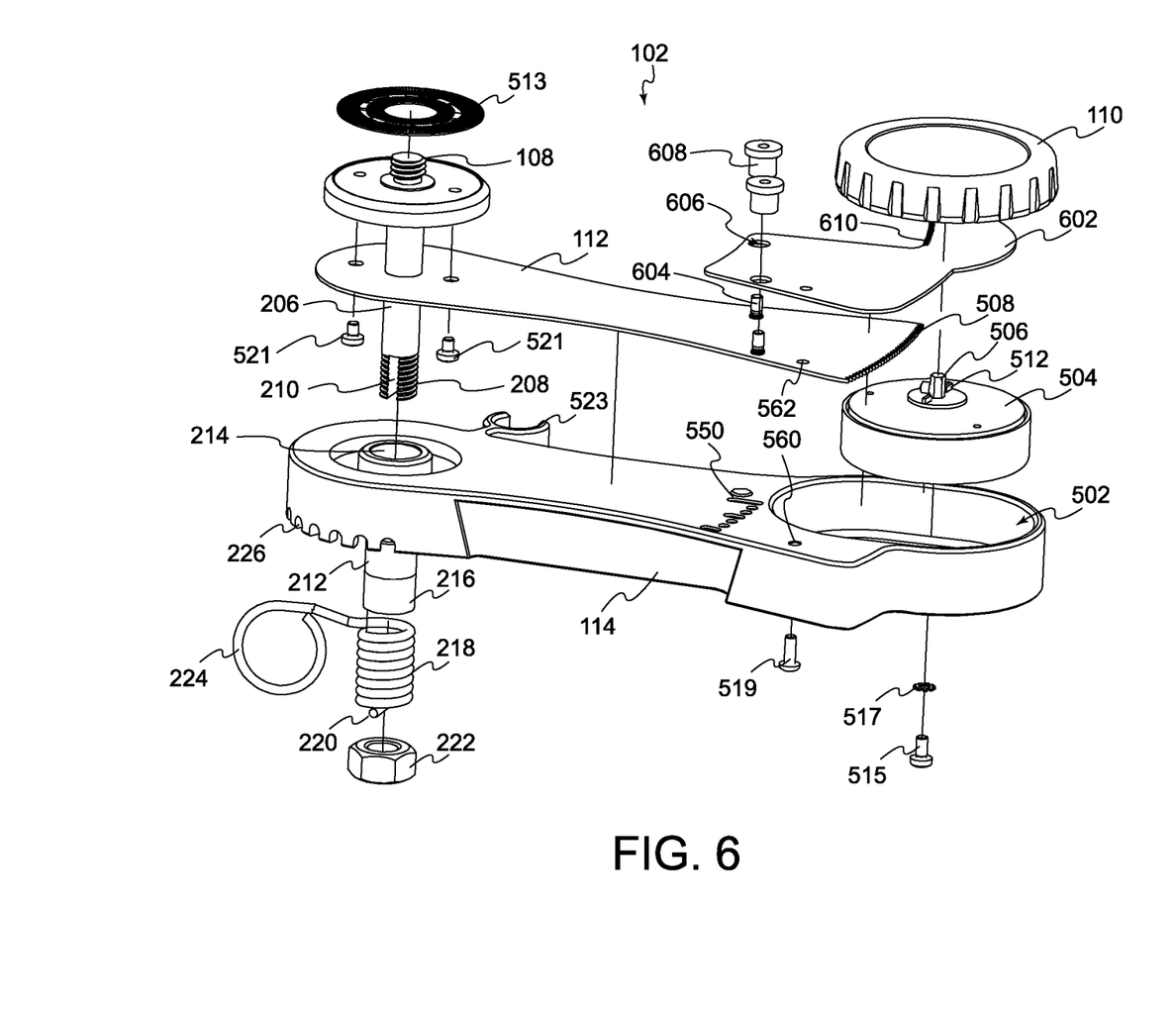
FIG. 6 is an exploded view of the mechanical tracking mount, in accordance with another embodiment of the present invention.

Turning to FIG. 6 and FIG. 9, like components and structures are identified by like reference numerals, and thus, the descriptions provided above, with respect to FIG. 5 and FIG. 8 apply equally well to the structures shown in FIG. 6 and FIG. 9. In an effort to focus on the distinctions between the embodiments shown in FIG. 5 and FIG. 6, the previously described structures will not be described herein except as applicable for describing the distinguishing structures in FIG. 6.

As noted above, FIG. 5 and FIG. 8 show an embodiment of the mechanical tracking mount 102 configured for tracking celestial bodies from the northern hemisphere. FIG. 6 and FIG. 9, show an embodiment of the mechanical tracking mount 102 configured for tracking celestial bodies from the southern hemisphere. The mechanical tracking mount 102 can be converted for operation from the southern hemisphere by the installation of a conversion plate 602.

The conversion plate 602 includes a set of teeth 610 facing in an opposite direction relative to the teeth 508 of the tracking arm 112. The conversion plate 602 can be mounted to the tracking arm using the above-mentioned mounting bolts 604. The mounting bolts 604 can be inserted into through-holes 606 formed on the conversion plate 602. A pair of thumb nuts 608 can be used to secure the conversion plate 602 to the tracking arm 112. In some embodiments, the thumb nuts 608 have textured or knurled perimeters to facilitate tool-less tightening and loosening of the thumb nuts 608. The mounting bolts 604 and thumb nuts 608 taken together are an example of a conversion plate holding means. Other means for holding the conversion plate 602 to the tracking arm 112, as known in the art, can be used in place of the mounting bolts 604 and thumb nuts 608 without deviating from the present invention.

As shown in FIG. 9 to properly mesh the teeth 610 with the gear 802, the timing assembly 504 may need to be shifted within the void 502 towards the rotational axis of the tracking arm 112. As shown in FIG. 8, the teeth 508 of the tracking arm 112 mesh with the gear 802 at a first side, which causes the tracking arm to rotate counter-clockwise when the winding knob 110 is turned clockwise to wind the timing assembly 504. The tracking arm 112 then rotates clockwise when the timing assembly 504 unwinds. Conversely, the teeth 610 of the conversion plate 602 mesh with the gear 802 from an opposite side. Thus, winding the timing assembly 504 by turning the winding knob 110 clockwise causes the conversion plate 602 and tracking arm 112 to rotate clockwise as well. Unwinding the timing assembly 504 causes the conversion plate 602 and tracking arm 112 to rotate counter-clockwise.

As described above, FIG. 7 shows a winding knob 110 in accordance with another embodiment of the present invention. The winding knob 110 can include a gear 704 configured to mesh with teeth 508 of the tracking arm 112. In this embodiment, the gear 802 shown in FIG. 8 and FIG. 9 is moved from the timing assembly 504 to an underside surface of the winding knob 110. A through-hole 702 is formed in the gear 704 at a center point and extends partially into the winding knob 110. The through-hole 702 is configured and dimensioned to receive an output shaft, such as the output shaft 506 of the timing assembly 504 shown in FIG. 5, for example.

Reference in the specification to "one embodiment" or "an embodiment" of the present invention, as well as other variations thereof, means that a particular feature, structure, characteristic, and so forth described in connection with the embodiment is included in at least one embodiment of the present invention. Thus, the appearances of the phrase "in one embodiment" or "in an embodiment", as well any other variations, appearing in various places throughout the specification are not necessarily all referring to the same embodiment. However, it is to be appreciated that features of one or more embodiments can be combined given the teachings of the present invention provided herein.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended for as many items listed.

The foregoing is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the present invention and that those skilled in the art may implement various modifications without departing from the scope and spirit of the invention. Those skilled in the art could implement various other feature combinations without departing from the scope and spirit of the invention. Having thus described aspects of the invention, with the details and particularity required by the patent laws, what is claimed and desired protected by Letters Patent is set forth in the appended claims.

What is claimed is:

1. A mechanical tracking mount, comprising:
a plurality of castellations in a semicircular arrangement at a first end of a base member, the base member having a through hole formed at a radial center of the plurality of castellations;
a tracking arm having a shaft extending perpendicular to a long axis of the tracking arm and a set of teeth formed at a position distal to the shaft, the shaft having a notch formed at an end opposite the tracking arm, the shaft dimensioned to be inserted into the through hole; and
a coil torsion spring having a crossbar formed at one end configured to mate with the notch on the shaft, a selector structure formed at another end of the coil torsion spring, the selector structure dimensioned to sit within a castellation of the plurality of castellations, wherein adjusting the position of the selector structure relative to the plurality castellations adjusts the coil torsion coefficient of the coil torsion spring.

2. The mechanical tracking mount as in claim 1, further comprising a timing assembly configured to rotate the tracking arm from a start position to a rest position over a set time interval, the timing assembly mounted on the base member at a position distal to the castellations.

3. The mechanical tracking mount as in claim 2, wherein the timing assembly includes an output shaft configured to undergo rotational motion.

4. The mechanical tracking mount as in claim 3, wherein the timing assembly includes a gear coupled to the output shaft, the gear being configured to rotationally mesh with the teeth of the tracking arm.

5. The mechanical tracking mount as in claim 3, wherein the timing assembly includes a winding knob coupled to the output shaft.

6. The mechanical tracking mount as in claim 5, wherein the winding knob includes a gear mounted on a surface of the winding knob facing the timing assembly and configured to mesh with the teeth of the tracking arm.

7. A mechanical tracking mount, comprising:
a plurality of castellations in a semicircular arrangement at a first end of a base member, the base member having a through hole formed at a radial center of the plurality of castellations;
a tracking arm having a set of teeth formed along an edge of the tracking arm, the tracking arm rotatably held at the radial center of the plurality of castellations; and
a coil torsion spring including a selector structure dimensioned to sit within a castellation of the plurality of castellations.

8. The mechanical tracking mount as in claim 7, wherein adjusting the position of the selector structure relative to the plurality of castellations adjusts the torsion coefficient of the coil torsion spring.

9. The mechanical tracking mount as in claim 7, further comprising a mounting bolt having a first threaded end configured to hold astronomical equipment, and a bolt shaft extending in a direction opposite the mounting bolt and coaxial therewith and dimensioned to extend through a through-hole formed at a position of the tracking arm opposite to the set of teeth and the through-hole formed on the base member.

10. The mechanical tracking mount as in claim 9, wherein the bolt shaft includes a transverse notch configured to accept and anchor a first end of the coil torsion spring, the bolt shaft extending through a central void of the coil torsion spring.

11. The mechanical tracking mount as in claim 7, further comprising a timing assembly configured to rotate the tracking arm from a start position to a rest position over a set time interval, the timing assembly mounted on the base member at a position distal to the castellations.

12. The mechanical tracking mount as in claim 11, wherein the timing assembly includes an output shaft configured to undergo rotational motion.

13. The mechanical tracking mount as in claim 12, wherein the timing assembly includes a gear coupled to the output shaft, the gear being configured to rotationally mesh with the set of teeth of the tracking arm.

14. The mechanical tracking mount as in claim 12, wherein the timing assembly includes a winding knob coupled to the output shaft.

15. The mechanical tracking mount as in claim 14, wherein the winding knob includes a gear mounted on a surface of the winding knob facing the timing assembly and configured to mesh with the set of teeth of the tracking arm.

16. The mechanical tracking mount as in claim 12, further comprising a conversion plate configured with a second set of teeth, the conversion plate configured to rotate the tracking arm in a counter-clockwise direction when rotating from the start position to the rest position.

17. The mechanical tracking mount as in claim 16, wherein the timing assembly includes a gear coupled to the output shaft, the gear being configured to rotationally mesh with the second set of teeth of the conversion plate for rotating the conversion plate.

18. A mechanical tracking mount for tracking celestial objects by astronomical equipment mounted thereon, the mechanical tracking mount comprising:

holding means for holding astronomical equipment;

mass balancing means for counter balancing the mass of the astronomical equipment held by the holding means, wherein the mass balancing means includes a coil torsion spring anchored at a first end, the coil torsion spring having a selector structure formed at a second end of the coil torsion spring, the selector structure dimensioned to sit within a castellation of a plurality of castellations formed as a semicircle along an edge of a base member of the mechanical tracking mount;

tracking means for rotating the astronomical equipment in synchronization with rotation of celestial objects tracked by the astronomical equipment; and mechanical timing means for generating rotation of the tracking means.

19. The mechanical tracking mount as in claim 18, wherein the tracking means includes a tracking arm having tracking arm moving means arranged at a distal end, the tracking arm being secured to the holding means and the mass balancing means.

\* \* \* \* \*